United States Patent [19]

Miller et al.

[11] 4,061,709
[45] Dec. 6, 1977

[54] MANUFACTURING TEXTURED GLOVES OF SILICONE RUBBER

[75] Inventors: Carl W. Miller, Bay City; Lester C. Vandenberg, Midland; Wayne H. Statt, Saginaw, all of Mich.

[73] Assignee: Dow Corning Corporation, Midland, Mich.

[21] Appl. No.: 590,347

[22] Filed: June 25, 1975

[51] Int. Cl.² ............................................. B29C 13/00
[52] U.S. Cl. ........................................ 264/293; 2/168; 264/294; 264/305; 264/307
[58] Field of Search ................ 2/168; 264/301, 303, 264/304, 305, 306, 307, 293, 294, 284, 232, 234, 83

[56] References Cited

U.S. PATENT DOCUMENTS

| | | | |
|---|---|---|---|
| 2,064,143 | 12/1936 | Belton et al. | 264/307 |
| 2,525,272 | 10/1950 | Rhoton | 264/307 |
| 3,255,492 | 6/1966 | Velonis et al. | 2/168 |
| 3,872,515 | 3/1975 | Miner et al. | 2/168 |
| 3,883,899 | 5/1975 | Ganz | 2/168 |

Primary Examiner—James B. Lowe
Attorney, Agent, or Firm—Howard W. Hermann

[57] ABSTRACT

There is described a method of manufacturing silicone rubber gloves with a non-blocking surface by repeatedly dipping a form in a solvent dispersion of uncured silicone rubber to build up a plurality of layers and then forming a layer of liquid droplets on the surface of the solvent-containing uncured rubber, thereby forming a textured surface as the solvent evaporates.

4 Claims, 5 Drawing Figures

MANUFACTURING TEXTURED GLOVES OF SILICONE RUBBER

BACKGROUND OF THE INVENTION

Surgical gloves are made of very thin rubber and are sized to provide a tight fit forming a skin-like sheath on the hand of the wearer. The objective of surgical glove manufacturers is to provide a glove which will impart maximum tactile sensitivity to the wearer without imparing his facility of manipulation while at the same time protecting the patient from contamination or infection. Surgical gloves are made either of rubber cement, latex, or silicone rubbers.

Rubber cement gloves are made by dipping or otherwise depositing a suitable form a solution of pure gum of dry para, smoked sheet or pale crepe type. The dipping or other means of deposition being repeated a relatively large number of times to place a deposition on the form of sufficient thickness. The rubber cement solution is made by dissolving milled rubber in a petroleum distillate solvent. After each deposition, it is necessary to allow the solvent to evaporate prior to the next deposition. It is frequently necessary to deposit and evaporate the solvent a large number of times in order to build a glove of sufficient thickness. The glove is then cured by subjecting the coated form to the surrounding fumes of a curing agent such as sulfur monochloride and then neutralize the curing agent with ammonium. The sulfur monochloride curing process is not considered very satisfactory because of the difficulty of controlling the vapor concentration and therefore the difficulty of controlling the amount of cure. The use of sulfur monochloride was introduced because of the impracticability of incorporating curing agents directly into rubber cement.

Latex rubber gloves may be formed by dipping or otherwise depositing a dispersion of natural rubber latex on an appropriate form. The dispersion may also contain a vulcanizing agent such as sulfur along with accelerators and preservatives. After each deposition on the form, an acid coagulant is applied to the deposition until it reaches the required thickness. Following each treatment with the coagulant the deposit is washed to neutralize and remove excess coagulant. Both latex and rubber cement gloves may have an adverse reaction to the skin of the wearer. Approximately 2% of all surgeons and medical personnel who wear surgical gloves suffer from some type of dermatitis caused by an allergy or sensitivity to the rubbers. It appears that the rubber cement is somewhat less allergenic than latex. Although rubber cement gloves are less likely to cause an allergic reaction than latex gloves, the latex glove is physically stronger and stands up better to repeated applications of live steam necessary for sterilization.

Surgical gloves may also be made of silicone rubbers. These rubbers are used to form gloves by dipping and have the advantage that they cause a minimum of allergenic reaction when properly cured.

Because of their skin tight fit and the nature of the materials from which they are made, dry lubricants have been used to permit surgical gloves to be easily placed on the hands of the wearer and to prevent them from sticking together when packaged.

Originally, talcum powder or talc was used as a dry lubricant. Talc even in the form of the finest dusting powder consists of sharp needle-like particles interspersed with thin platelets having sharp pointed corners. Due to their physical as well as their chemical nature, talcs have been known to irritate skin when brought into contact with it and have even been known to irritate the comparatively tough skin of the human hand. Furthermore, despite the most elaborate precautions during surgical proceedings, talc is often introduced into the living body by medical personnel wearing surgical gloves which have been dusted with it. It is well known in medical science that talcs can adversely affect the living body. In an effort to overcome the disadvantages of talc and starch dusting powders, inventors have proposed the use of a finely divided polyglycolic acid powder as disclosed in U.S. Pat. No. 3,728,739 issued Apr. 24, 1973, or the use of a finely divided insoluble sodium metaphosphate as disclosed in U.S. Pat. No. 2,621,333 issued Dec. 16, 1952. These alternative powders are much more expensive than starch powders. It has also been suggested that the powder be placed on the glove during its manufacture so that the powder in effect becomes embedded in the surface of the glove thereby avoiding the dangers to the patient mentioned hereinbefore. Of course, this additional step is expensive and is not always successful. The applicants have discovered that a convoluted or textured surface would reduce blocking of the glove surfaces.

The patent to Barasch U.S. Pat. No. 3,761,965 issued Oct. 2, 1973, discloses a sanitary glove having a textured surface provided by a granular vinyl chloride polymer embedded in the surface of the film from which the glove is manufactured. This glove is suitable for donning without the use of a lubricant such as powder, however, this type of glove has the same problem as the talc dusted type and is not generally suitable for surgical procedures.

The patent to Belton, et al. U.S. Pat. No. 1,983,963, issued Dec. 11, 1934, discloses a method of providing a textured surface on a rubber glove which subjects the vulcanized surface of the glove to the action of a rubber solvent or swelling agent such as naphtha, benzol or gasoline either by immersion or by subjecting the surfaces to the fumes of the mentioned chemicals. Obviously, this approach will not be of any assistance to the allergenic wearer.

SUMMARY OF THE PRESENT INVENTION

It is an object of the invention to provide a nonblocking, silicone rubber glove or similar article having a textured surface which is formed in situ and to the method for making the same.

It is another object of the invention to provide a glove having a convoluted or ridged surface which can be packaged, stored, shipped and when used conveniently donned without the use of a lubricant.

The invention generally contemplates providing a new and improved process of manufacturing silicone rubber articles made from solvent dispersions which are textured in situ while the uncured rubber is on the form. The texturizing is brought about by the application of a wet atmosphere (i.e., an atmosphere which will allow the deposition of non-coalescing fluid particles having the same or a higher heat of vaporization than the dispersion solvent) to the exposed surface as the solvent evaporates.

BRIEF DESCRIPTION OF THE DRAWINGS

Other objects and attendant advantages of the present invention will become obvious to those skilled in the art from a reading of the following detailed description when read in conjunction with the accompanying drawings wherein.

DESCRIPTION OF PREFERRED EMBODIMENTS

Figure 1:
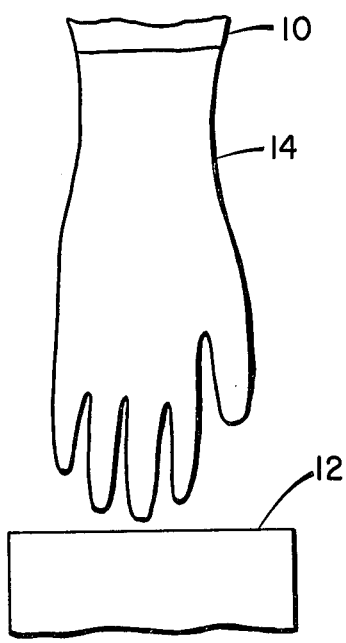
FIG. 1 is a side elevation showing the glove form, a partially formed glove and a dipping tank, broken away.

A seamless medical glove is formed according to the invention by dipping a group of spaced commercially available ceramic, metal or polyester glove forms 10, having a Teflon® coating, of approximately 0.005 inches, with a mat finish, into a tank 12 containing a dispersion of base polymer in a chlorinated solvent (trichloroethane). This dispersion comprises about 12-14% by weight of base polymer. A cross-linking agent such as a platinum catalyst is added to the dispersion at the time it is placed in the dipping tank although other cross-linking agents or catalysts can be used. Generally speaking, the silicone rubbers which may be used to form the glove have as a base polymer an organopolysiloxane and utilize either benzoyl peroxide, dichlorobenzoyl peroxide or other vulcanization systems that may be preferred. Either pure polydimethylsiloxane or polydimethylsiloxane having a small amount (up to about 0.5 mole percent) of methylvinylsiloxane units would provide excellent base polymers. Fillers may also be used in the rubber composition to increase tensile strength and reinforcing silicone fillers such as fumed silicas, silica aerogels, silica xerogels and certain treated silicas are satisfactory for this purpose having been shown to be inert, for the most part, to animal fluids and tissues when used as an integral part of the rubber formulation. The mat finish is provided on the Teflon® coating by buffing the Teflon® coating with wet sandpaper or coarse scouring pads or by controlled sand blasting.

Patent literature showing the preparation of silicone rubbers which may be used to form the glove is extensive. Illustrative patents include Warrick U.S. Pat. No. 2,541,137; Konkle et al. U.S. Pat. No. 2,890,188; Youngs U.S. Pat. No. 2,723,966; Tyler U.S. Pat. No. 2,863,846; and Johannson U.S. Pat. No. 3,002,951.

Automatic hydraulic controls, well known in the art, are used to control the rate of immersion and withdrawal as well as the period of submersion. The length of time of submersion and the number of submersions determines the glove thickness. The preferred thickness is from about 0.005 to 0.012 inches. The coating 14 on the forms are air dried after each submersion assuring that the trichloroethane is evaporated, which takes approximately 20 minutes depending on thickness, although other methods of drying may be utilized. Immediately upon withdrawal, after the final dispersion dip, the forms are exposed within a high vapor content chamber 18 (i.e., steam saturated atmosphere with an ambient temperature of less than 120° F.), for not less than 30 seconds or until a fine, non-coalescing layer of condensate has been deposited over the surface of the uncured glove. The uncured glove is then allowed to dry for 30 minutes before curing at 320° F. for approximately 2 hours in a vented oven. The atmosphere within the chamber may be any material which will allow the deposition of non-coalescing fluid particles having the same or a greater heat of vaporization than the dispersion solvent. The atmosphere if other than water may be alcohol or other alkyloxide, for example.

An alternative method is to take the uncured glove and dry it. It may then be dipped in the same or different solvent such as toluene or Freon and then exposed to the high vapor atmosphere while the solvent is evaporating and then subsequently curing the glove.

The results of the "water" treatment is to produce a series of ridges or convolutions which allow the glove to be donned without lubrication. A label 16 and a cuff bead 20 may be placed on the glove during the forming process prior to the final dip.

Figure 2:
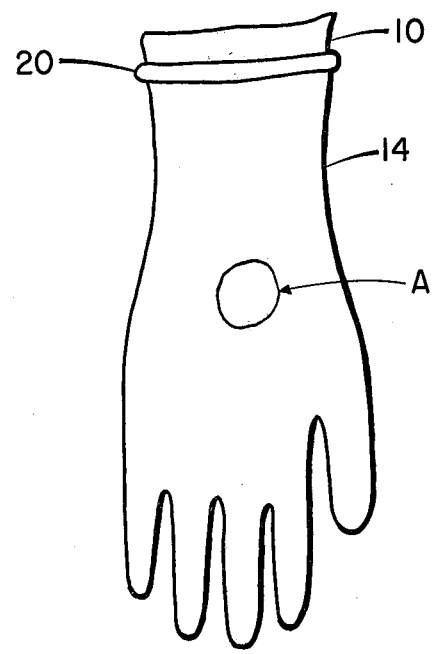
FIG. 2 is a side elevation showing the glove form and a partially formed glove after addition of the cuff bead.
Figure 3:
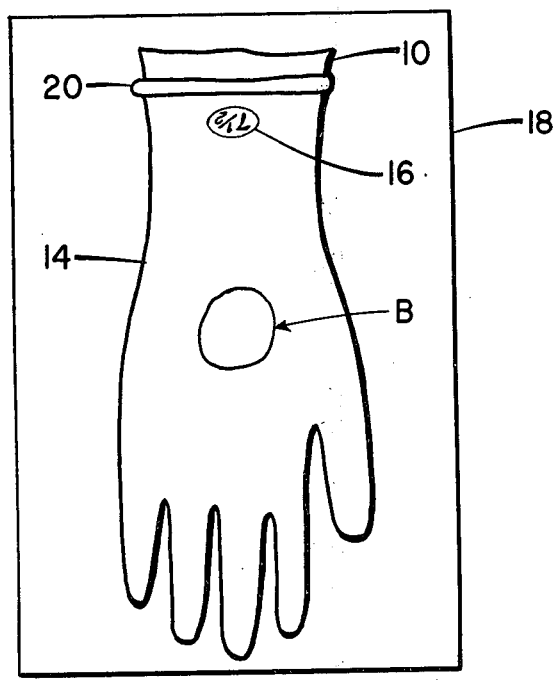
FIG. 3 is a side elevation showing the glove form and partially formed glove after addition of cuff bead and adherance of a label in a high vapor content chamber which is shown diagrammatically.
Figure 4:
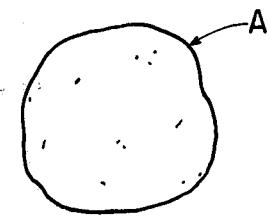
FIG. 4 is an enlargement of a portion of the partially formed glove shown in FIG. 2 prior to vapor treatment.
Figure 5:
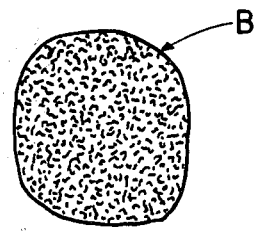
FIG. 5 is an enlargement of a portion of the partially formed glove shown in FIG. 3 after vapor treatment.

The applicants have indicated in FIG. 2 at A and in the enlarged view of A in FIG. 4 the appearance of the surface of the rubber prior to the "water" treatment and in FIG. 3 at B and in the enlarged view of B the appearance of the surface of the rubber subsequent to the "water" treatment indicating the convolutions.

That which is claimed is:

1. In a method of manufacturing textured gloves by repeatedly dipping a glove form into a solvent dispersion of uncured silicone rubber to build up a plurality of layers thereon, followed by drying and curing the silicone rubber layers to form a glove, the additional step, prior to curing the layers, of exposing the uncured solvent-containing surface of the last layer of silicone rubber to a wet atmosphere as the solvent evaporates until a fine non-coalescing layer of fluid particles has been deposited over the surface of the last layer, the atmosphere being chosen so that the fluid particles have the same or greater heat of vaporization than said solvent whereby a texturized surface effect is produced.

2. The method as defined in claim 1 wherein immediately prior to forming said layer of fluid particles the last layer of uncured rubber on the glove form is dried to evaporate the solvent, and is then immersed in the solvent for said uncured silicone rubber.

3. The method as defined in claim 2 wherein said layer of fluid particles is formed by exposing the surface of the uncured solvent-containing last layer of silicone rubber to a steam saturated atmosphere at a temperature less than 120° F. for at least 30 seconds.

4. The method as defined in claim 1 wherein said layer of fluid particles is formed by exposing the surface of the uncured solvent-containing last layer of silicone rubber to a steam saturated atmosphere at a temperature less than 120° F. for at least 30 seconds.

* * * * *